(12) United States Patent
Rakitzis

(10) Patent No.: US 11,425,812 B2
(45) Date of Patent: Aug. 23, 2022

(54) PRODUCTION OF NEUTRAL BEAMS OF HIGHLY SPIN-POLARIZED HYDROGEN ISOTOPES FROM MOLECULAR PHOTODISSOCIATION

(71) Applicants: Theodore Peter Rakitzis, Crete (GR); FOUNDATION FOR RESEARCH AND TECHNOLOGY-HELLAS (FORTH) / INSTITUTE OF ELECTRONIC STRUCTURE AND LASER (IESL), Crete (GR)

(72) Inventor: Theodore Peter Rakitzis, Crete (GR)

( * ) Notice: Subject to any disclaimer, the term of this patent is extended or adjusted under 35 U.S.C. 154(b) by 163 days.

(21) Appl. No.: 16/966,242

(22) PCT Filed: Feb. 2, 2018

(86) PCT No.: PCT/EP2018/052692
§ 371 (c)(1),
(2) Date: Jul. 30, 2020

(87) PCT Pub. No.: WO2019/149372
PCT Pub. Date: Aug. 8, 2019

(65) Prior Publication Data
US 2021/0051794 A1 Feb. 18, 2021

(51) Int. Cl.
*H05H 3/02* (2006.01)
*G21B 1/15* (2006.01)
*G21K 1/16* (2006.01)

(52) U.S. Cl.
CPC .............. *H05H 3/02* (2013.01); *G21B 1/15* (2013.01); *G21K 1/16* (2013.01); *Y02E 30/10* (2013.01)

(58) Field of Classification Search
CPC ... H05H 3/02; H05H 3/00; G21B 1/15; G21K 1/16; Y02E 30/10; Y02E 30/30; B01D 59/48

(Continued)

(56) References Cited

U.S. PATENT DOCUMENTS

| | | | | |
|---|---|---|---|---|
| 3,286,162 A | * | 11/1966 | Abragam | G21K 1/16 376/127 |
| 4,548,782 A | * | 10/1985 | Manheimer | G21B 1/23 376/127 |

(Continued)

OTHER PUBLICATIONS

Rakitzis, T. P., et al. "Spin-polarized hydrogen atoms from molecular photodissociation." Science 300.5627 (2003): 1936-1938. (Year: 2003).*

(Continued)

*Primary Examiner* — Darlene M Ritchie
(74) *Attorney, Agent, or Firm* — DP IP Group; Franco S. De Liguori

(57) ABSTRACT

A method and system for producing a neutral beam of spin polarized Hydrogen isotopes by photodissociating compound molecules are provided. Each compound molecule comprises a Hydrogen isotope and a second element. A molecular beam is generated by passing the compound molecules through a nozzle. The molecular beam is introduced into a photodissociation chamber. The molecular beam is photodissociated into spin polarized Hydrogen isotopes and second elements by intersecting the molecular beam with a circularly polarized photolysis laser beam. The spin polarized Hydrogen isotopes are guided, accelerated, and neutralized.

16 Claims, 9 Drawing Sheets

(58) Field of Classification Search
USPC ...... 376/105, 106, 130; 356/364; 250/338.1, 250/341.3, 251
See application file for complete search history.

(56) References Cited

U.S. PATENT DOCUMENTS

| | | | | |
|---|---|---|---|---|
| 4,642,206 | A | * | 2/1987 | Honig ........................ C01B 4/00 376/127 |
| 4,654,183 | A | | 3/1987 | Hershcovitch |
| 4,724,117 | A | | 2/1988 | Sterns et al. |
| 7,968,838 | B2 | * | 6/2011 | Dent ........................ H05H 3/06 250/251 |

OTHER PUBLICATIONS

Dimitris Sofikitis et al., "Highly Nuclear-Spin-Polarized Deuterium Atoms from the UV Photodissociation of Deuterium Iodide", PRL, Jun. 1, 2017, vol. 118, No. 23.

* cited by examiner

PRODUCTION OF NEUTRAL BEAMS OF HIGHLY SPIN-POLARIZED HYDROGEN ISOTOPES FROM MOLECULAR PHOTODISSOCIATION

The invention relates to the production of Hydrogen isotopes, more specifically to methods for the production of neutral beams of highly spin-polarized Hydrogen isotopes.

BACKGROUND

The increasing energy demand is an outstanding problem which nowadays requires efficient energy production methods. Nuclear energy is known to produce large amounts of energy by fission or fusion reactions from a small quantity of starting product as compared to conventional energy production methods such as coal.

In fusion reactions the atomic nuclei fuse into different nuclei or sub-atomic particles. These reactions release a large amount of energy which depends on the mass difference between the products and reactants. However, fusion reactions are complex reactions which are difficult to control.

Usually, fusion reactions require the nuclei to move at very high temperatures i.e. at very high kinetic energies, to increase the probability of collision, i.e. to increase the reaction cross section, to produce a fusion which releases large amount of energy.

In order to increase the reaction cross section of the nuclear fusion reaction it is desirable to control the nuclear spin of the involved nuclei, so that the fused nuclei comprise oriented nuclear spins. The use of oriented nuclear spin nuclei also enables controlling the emission direction of produced products and, depending on the case, the elimination of neutron emissions.

Additionally, current highly spin polarized atom production methods such as the Stern-Gerlach spin separation method, spin-exchange optical pumping or cryogenic cooling, provide reaction rates limited to about $10^{17}$ atoms per second which is far from the production rate required by the fusion nuclear reactors to operate, i.e. approximately $10^{22}$ spin-polarized atoms per second. That is, the production rates of current methods are not sufficient for guiding the required quantity of highly spin polarized atoms into nuclear reactors.

Besides, fusion nuclear reactors are designed to operate at extremely high temperatures (up to and above of 150.000.000° C.), i.e. temperatures needed to produce plasma, and also to be able to maintain the temperature or heat the generated plasma, which would involve high costs e.g. related to the refrigeration and/or to security systems.

In conclusion, there is a need to provide highly spin-polarized atom production methods which provide the required reaction rates, improve the efficiency of the fusion nuclear reactors and at the same time enable reducing the operational costs.

REFERENCES

T. P. Rakitzis, "*Highly spin-polarized atoms and molecules from rotationally state-selected molecules*" Phys. Rev. Lett. 94, 83005 (2005), herein "Rakitzis 2005".

L. Rubio-Lago, D. Sofikitis, A. Koubenakis, T. P. Rakitzis, "*Time-dependent polarization transfer from molecular rotation to nuclear spin*" Phys. Rev. A 74, 042503 (2006), herein "Rubio-Lago et al. 2006".

D. Sofikitis and T. P. Rakitzis "*Mesoscopic production of hyperpolarized 15N2O and H2O via optical excitation*" Phys. Rev. A 92, 032507 (2015), herein "Sofikitis et al. 2015".

T. P. Rakitzis, P. C. Samartzis, R. L. Toomes, T. N. Kitsopoulos, Alex Brown, G. G. Balint-Kurti, O. S. Vasyutinskii, J. A. Beswick, "*Spin Polarized Hydrogen Atoms from Molecular Photodissociation*" Science 300, 1936 (2003), herein "Rakitzis et al. 2003".

T. P. Rakitzis, "*Pulsed-Laser Production and Detection of Spin-Polarized Hydrogen Atoms*" ChemPhysChem 5, 1489 (2004), herein "Rakitzis 2004".

Dimitris Sofikitis, Luis Rubio-Lago, L. Bougas, Andrew J. Alexander, T. Peter Rakitzis, "*Laser-detection of spin-polarized hydrogen from HCl and HBr photodissociation: Comparison of H-and halogen-atom polarizations*" J. Chem. Phys. 129, 144302 (2008), herein "Sofikitis et al. 2008".

Nikolay V. Vitanov, Andon A. Rangelov, Bruce W. Shore, and Klaas Bergmann, "*Stimulated Raman adiabatic passage in physics, chemistry, and beyond*", Rev. Mod. Phys. 89, 015006 (2017), herein "Nikolay et al. 2017".

SUMMARY

For the sake of clarity some of the terms used in the current application will be defined in the following.

The term "Hydrogen isotopes" (Hi) refers at least to the naturally occurring isotopes Hydrogen (H) (also called "protium"), deuterium (D or $^2$H) or tritium (T or $^3$H).

The terms "photodissociation" and "photolysis" are used interchangeably. The photodissociation is a process in which chemical bonds of a molecule are broken by bombarding the molecule with photons (e.g. of different wavelengths). The photodissociation process can only polarize the electronic angular momentum i.e. the nuclei remain unpolarized, and such polarization is not generally of 100% (though in special cases polarization close to 100% can be reached).

In addition, the photodissociation may produce spin-polarized Hydrogen isotopes when:
- the light is circularly polarized,
- the chosen transition is "perpendicular", i.e. the projection of electronic angular momentum along the bond, $\Omega_g$ for the ground state and $\Omega_e$ for the excited state, is given by $\Omega_e = \Omega_g + 1$ (ideally, $\Omega_g = 0$ and $\Omega_e = 1$);
- the polarization is completely transferred from the polarized electron i.e. produced from the photodissociation, to the nucleus; and
- where no depolarizing mechanisms e.g. depolarizing collisions, occur.

The term "photofragment" refers to the resulting separated molecule parts after a photodissociation process of the parent molecule has taken place.

The "hyperfine interaction" is a splitting in the energy levels of particles, i.e. atoms, molecules and ions, caused by the interaction of the nuclear angular momenta with the electronic angular momentum, i.e. interaction of the nucleus or nuclei with internally generated electric and magnetic fields. An effect of the hyperfine interaction is a periodic transference of the polarization from the initially spin-polarized electrons, or polarized molecular rotation, to the nuclei and back. Therefore, the particle would be electronically polarized, nuclear spin polarized, or partially polarized during this transference.

The "reaction cross-section" characterizes the probability of a reaction to take place, i.e. a higher reaction cross-section involves a higher probability.

A "pulsed nozzle" is a nozzle that generates pulsed beams, directs the molecules of the beams in the same direction and with the same speed, thereby reducing the collisions and also the rotational and translational temperature of the beams (in the center-of-mass frame of the beam).

The "nuclear spin" is the angular momentum that atomic nuclei possess (denoted by the quantum number I) while the "electron or electronic spin" angular momentum (denoted by the quantum number J) is due to the orbital movement of the electrons around the atomic nuclei (denoted by the quantum number L), as well as the intrinsic electron spin (denoted by the quantum number S). L is an integer (0, 1, 2, 3, . . . ), whereas I and S can also take on half-integer values (0, ½, 1, 3/2, 2, 5/2, . . . ); e.g. for a single electron, S=½. The projections of these angular momenta (e.g. J) along a laboratory axis are quantized (e.g. with quantum number $m_J$), and range from the negative value of the quantum number to the positive value (e.g. $-J \leq m_J \leq +J$).

The "quantization axis" is the axis of the angular momentum, and is determined by the polarization direction of the photodissociation laser; applied magnetic fields are made to be parallel to the quantization axis.

The term "highly spin polarized" as used herein means that at least 50% of the Hydrogen isotopes of the compound molecule to be photodissociated are polarized.

In a first aspect, a method for producing a neutral beam of spin polarized Hydrogen isotopes by photodissociating compound molecules is provided. Each compound molecule comprises a Hydrogen isotope and a second element. A molecular beam is generated by passing the compound molecules through a nozzle. The molecular beam beam is introduced into a photodissociation chamber. The molecular beam is then photodissociated into spin polarized Hydrogen isotopes and second elements by intersecting the molecular beam with a circularly polarized photolysis laser beam. The spin polarized Hydrogen isotopes are guided out of the photodissociation chamber.

The spin polarized Hydrogen isotopes are accelerated and neutralized. The spin-polarized neutral Hydrogen-isotope beam may then pass through the magnetic fields of a nuclear reactor and enter therein.

By photodissociating compound molecules into spin polarized Hydrogen isotopes the production rates of such isotopes can be increased to $10^{22}$ s$^{-1}$ which is about $10^5$ times higher than the rates achieved by conventional methods e.g. Stern Gerlach method. The photodissociation of molecules or molecular ions to produce Hydrogen isotopes enables the obtained spin polarized Hydrogen isotopes to be used in polarized fusion in plasma which may substantially increase the effectiveness of nuclear fusion reactions. The obtained production rates fulfil the requirements to introduce the spin polarized isotopes in nuclear reactors i.e. a production rate of about $10^{22}$ atoms per second. Consequently, when the produced spin polarized isotopes are injected into a nuclear fusion reactor, the reaction cross-section of the nuclear reaction carried up in the reactor may be increased up to 60%. For example, in the D–T and D–$^3$He reactions, the reaction cross section is increased by about 50% while the reaction cross-section of H—$^{11}$B is increased by 60%. As a result, the energy production of the reactor is substantially increased, or the reactor can be operated more efficiently at a lower temperature.

Moreover, producing spin-polarized Hydrogen isotopes from compound molecules enables increasing the control over the fusion reaction that is taking place, and consequently, the control over the fusion reactor.

Some nuclear fusion reactions in which spin polarized Hydrogen isotopes may be added are summarized in the following:

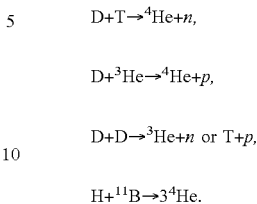

In some examples, the molecular beam of HiX molecules in the vibrational and rotational ground state is rovibrationally excited to a predetermined vibrational (v), rotational (J), and intermediate hyperfine (F') state with circularly polarized infrared (IR) light (where $F'=I_X+J$, and $I_X$ is the nuclear spin of atom (X)). The F' state is split into F states (with $F=F'+I_{Hi}$, where $I_{Hi}$ is the Hi nuclear spin, and F ranges from $|F'-I_{Hi}|$ to $F'+I_{Hi}$); however these splittings are very small (typically ~100 KHz or less), and all these F states should be excited coherently, e.g. with an IR laser having a linewidth broader than the F-state splittings (corresponding to a single F' state). Excitation of a single F' state (and all associated F states) may be defined as achieving "partial hyperfine resolution". The produced F' polarization may then be transferred to the Hi nuclei via the hyperfine interaction, and at the time of maximal polarization (up to 100%, for F' equal to Hi nuclear spin) the molecules may be photodissociated, ionized, then accelerated to the desired energy, and neutralized to give a polarized Hi beam.

In other examples, the molecular beam of HX molecules are bond-oriented with strong electric fields, and are then photodissociated with circularly polarized UV light, which produces Hi atoms with polarized electrons; the polarization from the electrons is transferred to the nuclei via the hyperfine interaction, and at the time of maximum polarization (up to 100%, for nuclear spin equal to ½) the Hi atoms are ionized, then accelerated to the desired energy, then neutralized to give a polarized Hi beam.

In an example, the method further comprises aligning molecular bonds of the molecular beam in a predetermined orientation before photodissociating.

In an example, the method further comprises selecting molecules of the molecular beam having a predetermined orientation after photodissociating.

By aligning the (randomly) oriented molecule bonds into a predetermined orientation, e.g. parallel to the quantization axis, before photodissociating or selecting only those molecules having a predetermined orientation, the polarization loss, i.e. of a factor of 5/2, is avoided and therefore, the maximum electron polarization is obtained. A neutral beam of highly spin polarized Hydrogen isotopes may therefore be obtained. In addition, by aligning the bonds along the quantization axis, any parallel transitions which may be present (and which yield unpolarized photofragments) are eliminated.

In an example, the method further comprises exciting the molecular beam rovibrationally to a predetermined vibrational, rotational and intermediate hyperfine state before photodissociating, for example, with a circularly polarized infrared light.

In an example, the circularly polarized photolysis laser beam is a short pulsed laser beam.

In an example, the method further comprises ionizing the spin polarized Hydrogen isotopes by intersecting the molecular beam with an ionization laser beam or with an electron beam thereby isolating a desired polarization of the spin polarized Hydrogen isotopes.

In an example, ionizing of the spin polarized Hydrogen isotopes is performed before photodissociating the molecular beam. In another example, ionizing the spin polarized Hydrogen isotopes is performed after photodissociating the molecular beam.

In an example, the method further comprises applying a strong magnetic field e.g. above 0.1 T, to the spin polarized Hydrogen isotopes after photodissociating.

In an example, the method further comprises providing the compound molecules in a mixing chamber; and mixing the compound molecules with an inert gas or an inert molecule in the mixing chamber thereby obtaining a mixture. Then, the mixture is passed through a nozzle.

In an example, photodissociating comprises photodissociating molecular beam into spin-polarized Hydrogen isotopes and second elements.

In an example, the second element is selected from any of Fluorine (F), Chlorine (Cl), Bromine (Br), Iodine (I), Mercury (Hg), Oxygen (O) and Sulfur (S).

In an example, the produced neutral beam of Hydrogen isotopes comprises at least the 50% of the compound molecule Hydrogen isotopes.

In a second aspect, a photodissociation system for producing a neutral beam of spin polarized Hydrogen isotopes by photodissociating compound molecules is provided. The photodissociation system comprises a nozzle, a photodissociation chamber, a circularly polarized photolysis laser source, means to accelerate the spin polarized Hydrogen isotopes (to high energy), means to neutralize the spin polarized Hydrogen isotopes and means to guide the molecular beam out of the photodissociation chamber e.g. into the desired target, such as a nuclear reactor.

In an example, the photodissociation system further comprises means for selecting molecular bonds of the molecular beam parallel to a quantization axis, said means being arranged with the photodissociation chamber. In an example, the means for selecting comprise one or more spatial filters.

In an example, the photodissociation system further comprises means for aligning molecular bonds of the molecular beam, said means being arranged with the photodissociation chamber.

In an example, the means for aligning molecular bonds is an alignment laser source. In an example, the means for aligning comprise a strong static electric field generator. In an example, the means for aligning comprise one or more high-intensity short pulse laser sources.

In an example, the photodissociation system further comprises means for exciting the molecular beam rovibrationally to a predetermined vibrational, rotational and intermediate hyperfine state. In an example, such means for exciting comprise a circularly polarized infrared laser source.

In an example, the photodissociation system further comprises an ionization laser source or an electron beam source arranged with the photodissociation chamber to generate an ionization laser beam or an electron beam to intersect with the molecular beam thereby isolating a desired polarization of the spin polarized Hydrogen isotopes.

In an example, the nozzle is a pulsed nozzle which generates a pulsed molecular beam.

In an example, the photodissociation system further comprises a mixing chamber in which the compound molecules are mixed with an inert gas or an inert molecule.

In an example, the second element is selected from any of Fluorine (F), Chlorine (Cl), Bromine (Br), Iodine (I), Mercury (Hg), Oxygen (O) and Sulfur (S).

In an example, the circularly polarized laser source is configured to photodissociate the molecular beam into spin-polarized Hydrogen isotopes and second elements.

In a third aspect, a nuclear reactor system is provided. The nuclear reactor system comprises a nuclear reaction module, at least one photodissociation system, according to previous examples disclosed herein, to produce spin-polarized Hydrogen isotopes, a collision module and a connector to connect the nuclear reaction module to the collision module.

In an example, the collision module is connected to the photodissociation system(s) and to the reaction module.

In an example, the collision module is arranged within one of the at least one photodissociation systems.

In an example, the at least one photodissociation system comprises a single photodissociation system.

In an example, the collision module comprises means to neutralize spin polarized Hydrogen isotopes.

In an example, the at least one photodissociation system according to any of the disclosed examples is configured to produce spin polarized Hydrogen isotopes.

BRIEF DESCRIPTION OF THE DRAWINGS

Non-limiting examples of the present disclosure will be described in the following, with reference to the appended drawings, in which.

DETAILED DESCRIPTION

Figure 1A:
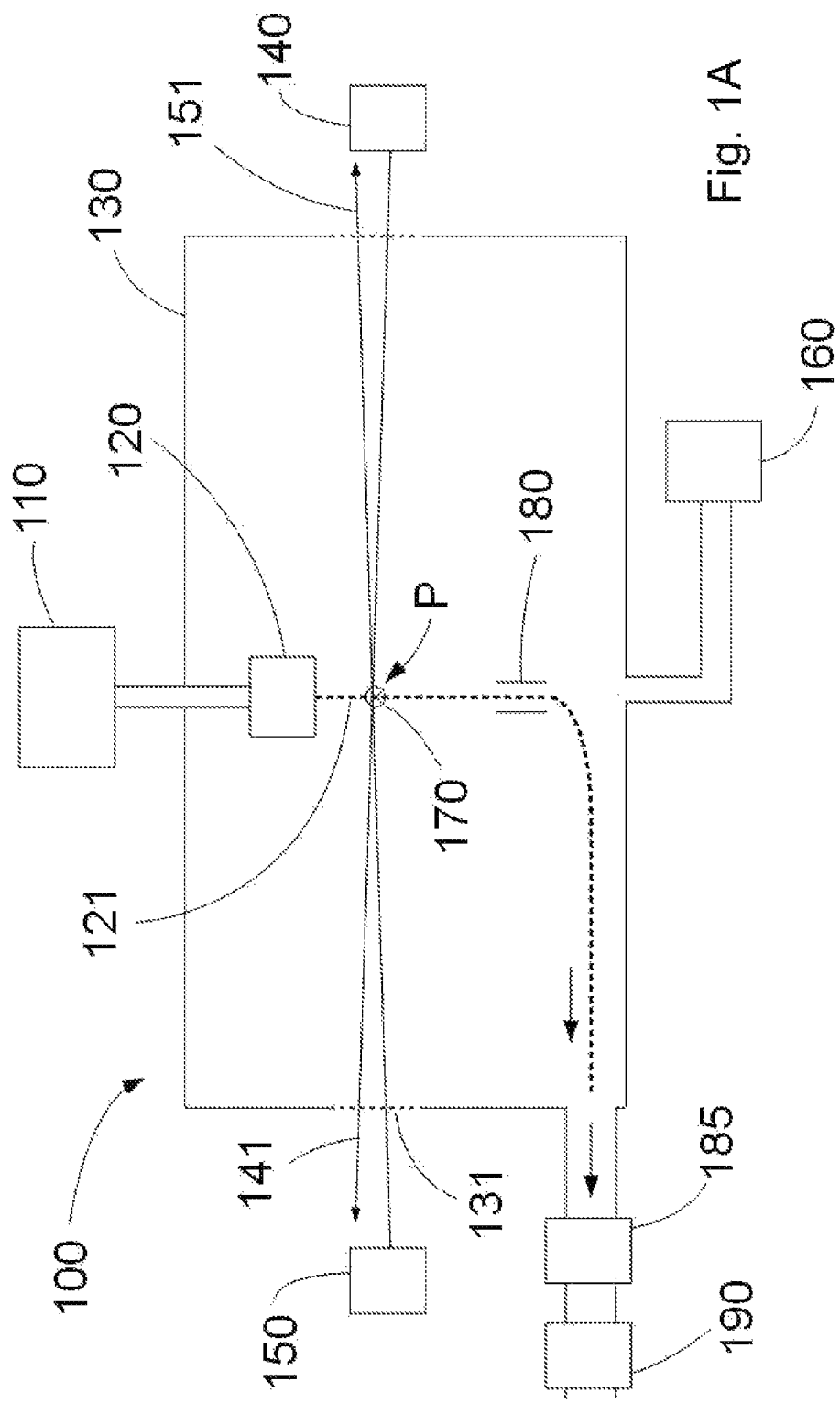
FIGS. 1A-1C schematically illustrate systems for producing a neutral beam of spin polarized Hydrogen isotopes according to examples.

FIG. 1A shows a top view of a system 100 for producing a neutral beam of spin polarized Hydrogen isotopes, according to an example. The system 100 may comprise a mixing chamber 110, a nozzle 120 and a photodissociation chamber 130.

The mixing chamber 110 may be coupled to the nozzle 120 and may store the compound molecules until they are passed through the nozzle 120. The compound molecules to be photodissociated may be formed by a Hydrogen isotope e.g. Hydrogen (H), Deuterium ($^2$H or D) or Tritium ($^3$H or T), and a second element X selected e.g. from any Fluorine (F), Chlorine (Cl), Bromine (Br), Iodine (I), Mercury (Hg), Oxygen (O) or Sulphur (S). Therefore, the compound molecules may have the form of any of HX, DX or TX. Such compound molecules may be externally provided or may be synthesized for example using the following reaction:

$$3D_2O + PI_3 \rightarrow 3DI + H_3PO_3$$

Optionally, in an example, the compound molecules may be mixed in the mixing chamber 110 with an inert gas e.g. a Noble gas such as He, or with an inert molecule e.g. $N_2$, thereby obtaining a mixture. The inert gas or molecule may be used e.g. to prepare a subsequent cold supersonic expansion of the compound molecules in the photodissociation chamber. In an example, the mixing chamber 110 may be e.g. a gas cell.

In an example, the system 100 of FIG. 1A may not comprise a mixing chamber 110 and thus, the compound molecules (or the mixture previously mixed) may be directly provided into the nozzle 120 e.g. by directly coupling a gas container comprising the compound molecules (or the mixture) to the nozzle.

The nozzle 120 may be coupled to the photodissociation chamber 130 and may generate a molecular beam 121 when the compound molecules are passed through it. The generated beam may then expand in the photodissociation chamber 130.

In the example of FIG. 1A, the nozzle 120 may be a pulsed nozzle which may generate pulsed molecular beams. In another example, the nozzle 120 may be a slit nozzle i.e. a nozzle comprising a slit instead of a hole, which may enable long path lengths e.g. of at least 10 cm. In a further example, the nozzle 120 may be a continuous beam nozzle which may generate a continuous molecular beam.

The nozzle 120 may be placed inside the photodissociation chamber 130 (as shown in FIG. 1A) or coupled to the chamber 130 to introduce the molecular beam 121 and/or enable the molecular beam's expansion.

The photodissociation chamber 130 depicted in FIG. 1A may be a vacuum chamber which may comprise or be attached to a vacuum pump 160 to achieve a vacuum e.g. of about $10^{-5}$ Pa (or about $10^{-10}$ atm), before introducing the molecular beam 121.

The system 100 of FIG. 1A may further comprise a photodissociation laser source 140 arranged within the photodissociation chamber 130. The photodissociation laser 140 source may generate a photolysis laser beam 141 intended to intersect the molecular beam 121 e.g. at 0°, 90°, etc. at intersection point P, thereby breaking the molecular bonds of the compound molecules. As a consequence, the compound molecules may be separated into photofragments, i.e. Hydrogen isotopes and second elements, which may be subsequently electronically polarized.

In the example of FIG. 1A, the photodissociation laser source 140 may be placed outside the photodissociation chamber 130 which may comprise windows, apertures or the like 131 to enable the photolysis laser beam 141 to penetrate into the chamber 130.

In another example, the photodissociation laser source 140 may be placed inside the photodissociation chamber 130. In such cases, the photodissociation chamber would not require any window, aperture or the like 131 to enable the photolysis laser beam 141 to get into it.

The photodissociation laser source 140 may comprise polarization means (not shown) so as to polarize the photodissociation laser beam 141 e.g. circularly. In an example, the photolysis polarization may be right circularly polarized, and therefore spin up photofragments would be obtained. In another example, the photolysis polarization may be left circularly polarized and as a result, spin down photofragments would be obtained.

In an example, the photodissociation laser source 140 may be a short pulsed laser source e.g. having a pulse width less than 1 ns, for example when the nozzle 120 is a pulsed nozzle.

In another example, the photodissociation laser source 140 may be a continuous beam source, e.g. when the nozzle 120 is a continuous nozzle.

Indeed, each molecular beam 121 may be intersected by a single laser beam, by a plurality of laser beams or by one or more laser beams reflected by mirrors (not shown) thereby intersecting the molecular beam a plurality of times.

In order to maximize the electronic polarization and therefore, produce highly spin polarized isotope, the system 100 of FIG. 1A may further comprise alignment means to orientate the molecular bonds of the isotopes e.g. in an orientation parallel to the photolysis polarization axis e.g. parallel to Z axis, before the photodissociation. In an example, the photolysis polarization axis may be the quantization axis.

The alignment means may be strong static electric field sources or strong field producing high-intensity short-pulse laser sources 170 as shown in FIG. 1A. The alignment means may be placed inside or outside the photodissociation chamber 130 and may be arranged so as to intersect the molecular beam 121 in a predetermined angle e.g. perpendicularly (as shown in FIG. 1A) or at 0°, at intersection point P.

Alternatively, the system 100 of FIG. 1A may comprise filtering means (not shown) which may, after photodissociation, select the Hydrogen isotope photofragments having molecular bonds orientated at a predetermined orientation e.g. parallel to the photolysis polarization axis, while the rest may be discarded. The filtering means (not shown) may be e.g. spatial filters or Doppler selectivity ionization sources.

As previously mentioned, as consequence of the photodissociation, the photodissociated photofragments would be electronically polarized, however, due to the hyperfine interaction, such polarization would be transferred to the nucleus and back in a predetermined period of time e.g. of a few nanoseconds. Therefore, depending e.g. on the reaction that would take place, it would be desirable to isolate the polarization of photodissociated Hydrogen isotopes e.g. when it is transferred to the nuclei, i.e. nuclear polarization, or when it is transferred back to the electrons i.e. the electronic polarization. Indeed, for some fusion nuclear reactions highly nuclear-spin polarized Hydrogen isotopes may be preferred to promote the reaction and/or increase the reaction cross section.

The system 100 of FIG. 1A may further comprise ionizing means 150 for isolating the desired polarization, i.e. nuclear or electronic, of the Hydrogen isotopes source which may generate an ionizing laser beam 151. In the example of FIG. 1A, the ionizing means 150 may be an ionization laser source. In an alternative example, the ionizing means 150 may be an electron beam laser source. The ionizing means 150 may be arranged to intersect the molecular beam 121 at a predetermined angle e.g. perpendicularly or at 0°, at intersection point P.

In the example of FIG. 1A the photodissociation laser source 140 and the ionizing means 150 may be placed outside the photodissociation chamber 130, in opposite directions but substantially aligned to enable both laser beams 141, 151 to be substantially parallel and to intersect the molecular beam at a predetermined angle e.g. near 90°, at the intersection point P. As previously mentioned, in case any laser or beam source is placed outside the photodissociation chamber 130 windows, apertures or the like may be provided to the photodissociation chamber 130 in order to ensure the access of the beam.

Moreover, the photodissociation laser source 140 and the ionizing means 150 may be arranged so that both beams 141, 151 intersect the molecular beam substantially simultaneously e.g. with a difference of substantially less than 0.7 ns, or substantially at intersection point P, i.e. to control the polarization transfer period in order to isolate the polarization, as once the compound molecules are photodissociated into Hydrogen isotopes the polarization transfer occurs almost simultaneously i.e. in substantially less than 0.7 ns. In another example, the molecular beam may be ionized before photodissociation.

In an example, the photodissociation laser source 140 and the ionizing means 150 may be placed inside the photodissociation chamber 130, and consequently, no window or aperture would be necessary to enable the beams 141, 151 to enter into the photodissociation chamber 130.

In another example, the photodissociation laser source 140 and the ionizing means 150 may be arranged substantially nearby i.e. to enable both beams 141, 151 to be almost parallel and/or coaxial to intersect the beam substantially simultaneously at a predetermined angle e.g. 0°.

In an example, the system 100 may additionally comprise ion deflection means (not shown) to guide the ionizing beam 151, i.e. an ionization laser beam or an electron beam, to a predefined location i.e. to the intersection point P in which photodissociation laser beam 141 may intersect the molecular beam 121.

The different beams e.g. the photodissociation laser beam 141, may intersect the molecular beam 121 at different angles e.g. at almost 0° or at 90°. In practice, harder intersection angles i.e. close to 0°, might have advantages over greater angles e.g. 45°, as substantially parallel angles result in a bigger overlapped area. Therefore, a higher number of molecules may be intersected e.g. by the photodissociation laser beam 141, which result in higher production rates. In addition, bigger angles e.g. 90°, may be easier to obtain.

Besides, the system 100 of FIG. 1A may comprise a strong magnetic field source (not shown) so as to impede the electronic polarization to be transferred to the nuclei after photodissociation process. Therefore, highly electron-spin polarized isotopes would be produced. The generated strong magnetic field may be parallel e.g. to the spin quantization axis, and its value may be e.g. above 0.1 T.

The system 100 may additionally comprise neutralizing/depolarizing means 190 to neutralize the spin polarized Hydrogen isotopes e.g. to introduce the isotopes into a nuclear reactor. In an example, the neutralizing means 190 may be a polarized electron source.

The system 100 may further comprise guiding means 180 for guiding the highly spin polarized Hydrogen isotopes out from the photodissociation chamber (see the arrow in FIG. 1A) e.g. into a nuclear reactor. In the example of FIG. 1A, the guiding means 180 may be deflection plates which may modify the path of the spin polarized Hydrogen isotopes electrostatically. In an example, the deflection plates may be arranged so that the generated electrostatic field to be perpendicular to e.g. the photodissociation laser beam path (see FIG. 1A).

The system 100 may further comprise accelerating means 185 which accelerate the spin polarized Hydrogen isotopes e.g. to between 1 keV-1 MeV, for example to between 50 keV and 100 keV, to enable the spin polarized Hydrogen isotopes to be able to heat the plasma at a fusion temperature.

Figure 1B:
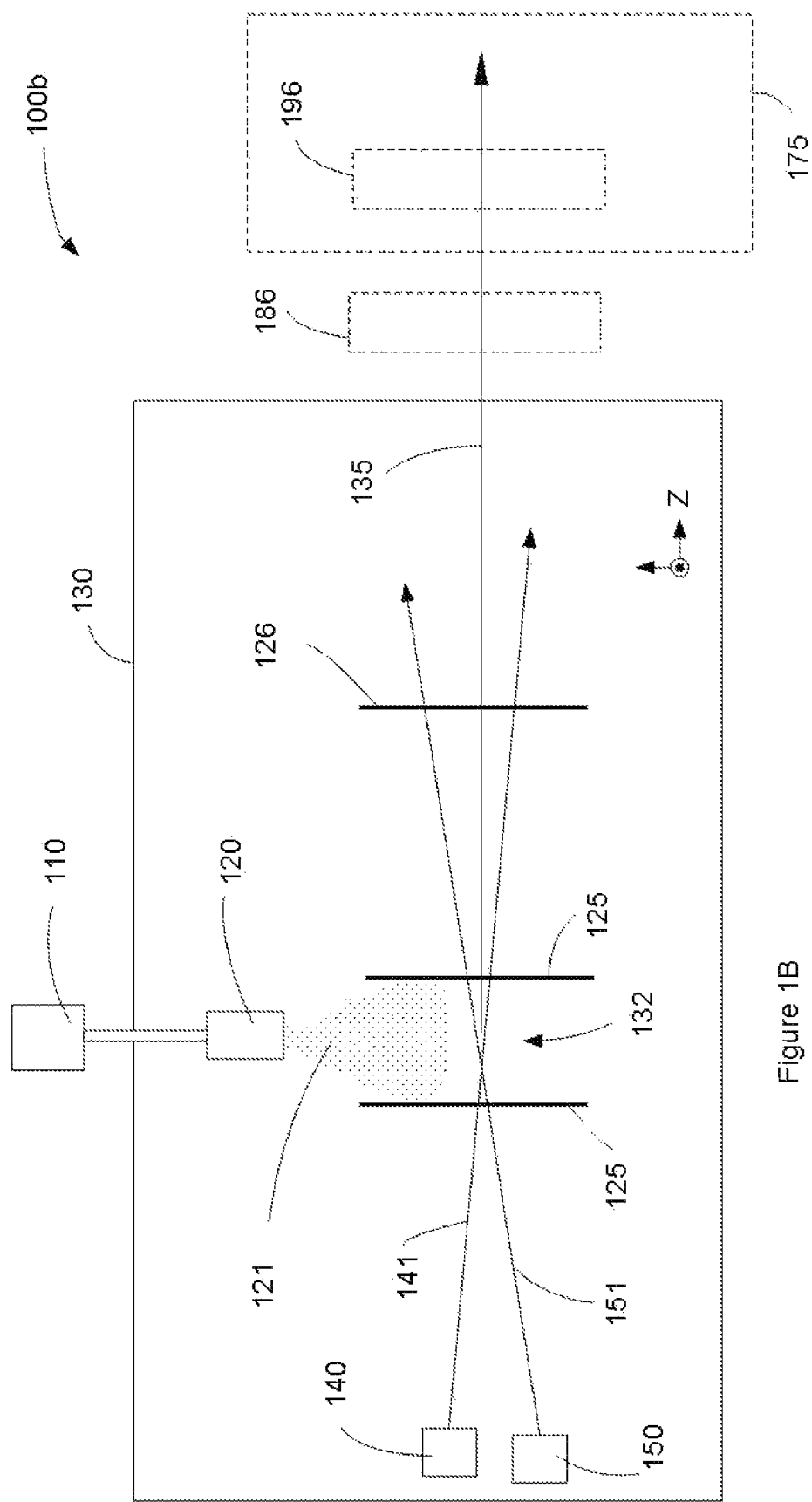

FIG. 1B depicts an example of system 100b which may comprise a photodissociation chamber 130, an ion acceleration region 186 and a neutralization region 196. The system 100b may comprise a mixing chamber 110 that may be arranged out of the photodissociation chamber 130 and which may comprise a mixture of HiX molecules and a buffer gas, e.g. He, Xe, $SF_6$, etc. The mixture may be expanded into the photodissociation chamber 130 from high pressure e.g. about 1-10 bars, into vacuum through a nozzle 120, e.g. a pulsed nozzle, to create a molecular beam 121, with a speed (v) e.g. of about 1 km/s.

The molecular beam 121 may reach the laser interaction region 132 in which the bonds of the HiX molecules i.e. of the molecular beam 121, may be aligned with a static electric field e.g. parallel to the Z axis. The static electric field may be generated e.g. by electric plates 125. Alternatively, the bonds of HiX molecules may be aligned using a strong field of a laser parallel to the Z axis.

The system 100b may comprise a photodissociation laser source 140 which may emit a photodissociation laser beam 141 e.g. with a pulse length at least 5 times shorter than the hyperfine beating period, for example substantially below 700 ps for H and T, and substantially below 3 ns for D. The photodissociation laser beam 141 may be circularly polarized along the Z axis and may photodissociate the HiX molecules, thereby producing Hi atoms with highly spin-polarized electrons (with polarization along Z axis) and X particles.

Due to the hyperfine beating period (i.e. the period of the quantum beat caused by the coherent excitation of the hyperfine states of H/T and D, and the subsequent quantum beats caused by the hyperfine energy splittings in H/T and D) e.g. about 0.7 ns for H and T, and 3 ns for D; the electronic spin-polarization is transferred to the nuclear spin of the Hi atoms, and back. When the nuclear spin polarization is maximal, the nuclear-spin-polarized Hi atoms may be ionized by an ionization beam 151 e.g. a laser beam or an electron pulse. To that end, the system 100b may comprise ionizing means 150 which may generate the ionization beam 151.

The Hi ions beam 135 i.e. after being ionized, may be accelerated by electric fields along the Z axis. The electric fields may be created by electric field plate 126 and may guide the Hi ions towards an acceleration region 186. In the acceleration region 186, the Hi ions beam 135 may be accelerated e.g. by electric fields parallel to Z axis, in order to reach the desired energies e.g. 50 keV-1 MeV.

The Hi ions beam 135 may enter a magnetic field region 175 which may comprise a magnetic field (B) e.g. along Z which may be greater than the critical magnetic field ($B_c$) needed to decouple the nuclear spin from the electron spin in Hi atoms. The value of the critical magnetic field for H and T is about 50 mT and about 10 mT for D. The presence of a magnetic field (B) greater than the critical magnetic field ($B_c$) ensures that there may not be a significant transfer of polarization from the nuclear spin to the electron spin.

The Hi ion beam 135 may pass into a neutralization region 196, in which the Hi ions may pick up an electron and become neutral Hi atoms, and thus, a neutral molecular beam may therefore be obtained.

The fast, neutral nuclear-spin-polarized Hi atomic beam may afterwards enter a nuclear reactor.

Figure 1C:
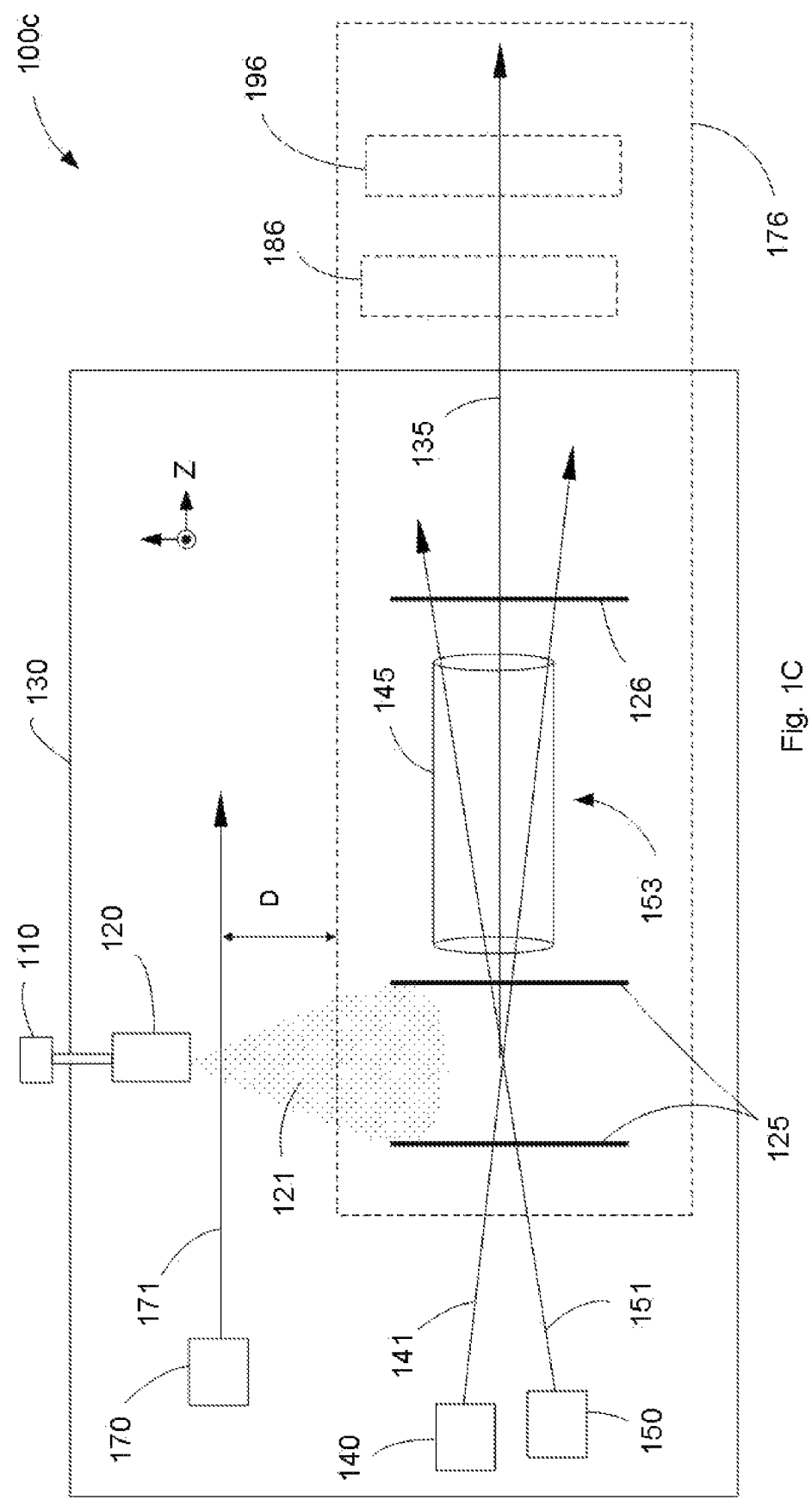

FIG. 1C depicts a system 100c which may comprise a photodissociation chamber 130, a magnetic field region 176, an acceleration region 186 and a neutralization region 196. The system 100c may comprise a mixing chamber 110 in which a mixture of HiX molecules and a buffer gas e.g. He, Xe, $SF_6$, may be stored. The mixture may be expanded from high pressure, e.g. of about 1-10 bars, into vacuum through a nozzle 120 thereby creating an expanded molecular beam 121. As in previous examples, the nozzle 120 may be any suitable nozzle such as pulsed or continuous nozzle. The molecular beam 121 may have a speed (v) e.g. of about 1 km/s, and may have nearly all of the molecules in the vibrational and rotational ground state i.e. a state comprising v=0 and J=0.

The system 100c of FIG. 1C may further comprise an infra-red (IR) source 170 that may be arranged inside the photodissociation chamber 130 and which may generate an infra-red (IR) laser beam 171. The IR beam 171 may be circularly polarized and may have a quantization axis parallel to the Z axis. The (expanded) molecular beam 121 may pass through the IR laser beam 171, and may therefore be excited to a specific vibrational, rotational and intermediate hyperfine state which would have a quantum number (F'). The quantum number F' may be obtained from the vector sum in the following formula:

$$F'=J+I_X;$$

Wherein J is the rotational angular momentum of the HX molecule, and $I_x$ is the nuclear spin of the X atom. In an example, the intermediate hyperfine state and the other quantum states, after the excitation, may comprise the following values: v=2, J=3, F'=½ or 3/2, and $M_{F'}$=F'.

Then, the molecular beam 121 of HiX molecules in the (F', $M_{F'}$=F') state begins hyperfine beating [F' is the vector sum of the J and $I_x$ quantum numbers (previously defined), ranging from $|J-I_x|$ to $(J+I_x)$. $M_{F'}$ is the projection of F' along the laboratory quantization axis (defined by the polarization axis of the IR lasers in the excitation step). $M_{F'}$ takes the maximal value, as $M_{F'}$=F']. Consequently, the polarization from the (F', $M_{F'}$=F') state would be transferred to the nuclear spin of the Hi via the hyperfine interaction. The time ($t_{1/2}$) needed for obtaining the maximal polarization transfer is known from the hyperfine splittings, and the following formula can be used to determine the appropriate values for D and v:

$$t_{1/2}=D/v,$$

wherein D is the distance between the IR laser beam axis and the magnetic field region, and wherein v is the laser beam velocity.

The molecular beam 121 may enter a magnetic field region 176 in which the magnetic field (B) may be greater that the critical magnetic field ($B_c$). The magnetic field B would decouple the Hi nuclear spin from the other molecular angular momenta, and therefore, the Hi nuclear polarization would be frozen at its maximal value.

Optionally, the molecular beam 121 may enter a large electric field region which may be parallel to Z axis and which may be generated by bond-alignment electric field plates 125. The electric field may orient the bonds of HiX molecules along axis Z. Such bond orientation may ensure that, upon photodissociation i.e. when HiX molecules separate into Hi and X particles, the Hi molecules would be recoiled/collected preferably along Z axis and X particles would be recoiled/collected preferably along −Z axis.

The molecular beam 121 may be photodissociated by a photodissociation laser beam 141 that may be generated by a photodissociation laser source 140. The photodissociation laser may be a UV laser which may be pulsed or continuous according to the type of molecular beam 121. That is, in an example in which the molecular beam 121 is a pulsed beam the photodissociation laser 141 may also be a pulsed laser beam. The spin-polarized Hi atoms would recoil along Z axis, towards the ionization region 153.

The system 100c may comprise a magnetic field region 176 having a magnetic field (B) greater than critical magnetic field ($B_c$) in order to ensure that the nuclear spin polarization of Hi would not be transfer to the electron spin.

The system 100c of FIG. 1C may further comprise ionization means 150 which may generate an ionizing beam 151 which may ionize the molecular beam 121 and may remove an electron and thereby form Hi⁺. In an example, the ionizing beam 151 may be a laser or an electron beam. In another example, the ionizing beam 151 may be an Hi'⁻ ion beam 151, whereby the Hi' ion beam 151 is not the neutral Hi beam to be ionized, but a beam generated in ionizing means 150 that afterwards interacts with the molecular beam 121 which has passed through the nozzle. In such cases an electron may be transferred from the Hi'⁻ to the neutral Hi, to form Hi⁻.

Optionally, the system 100c may comprise a tube 145 e.g. a glass tube, which may be arranged along Z axis. The tube 145 may contain the Hi atoms along Z axis, so that the Hi atoms with off-axis velocity projections may be reflected back. The tube 145 may be coated with a material e.g. dimethyldichlorosilane, that facilitates the atoms to bounce and not to be adhered.

Then, the Hi ions 135 may be accelerated by the electric fields generated by electric field plate 126 along the Z axis, and moved towards an acceleration region 186 where the Hi ions may be accelerated by electric fields parallel to Z axis in order to reach the desired energies e.g. 50 keV-1 MeV.

The Hi ions may pass into a neutralization region 196 in which the Hi ions may become neutral Hi atoms. In an example, the neutralization of Hi atoms may be achieved by applying neutral Hi' atoms, from which the Hi⁺ ions can remove an electron, to form Hi. In an example, the neutralization of Hi atoms may be achieved by intersecting the Hi atoms with intense photodetachment lasers (i.e. Lasers which photoionize a negative ion: Hi⁻+hf→Hi+e⁻). In such cases, the photons would remove the extra electron from Hi⁻ and consequently Hi would be formed.

The fast, neutral nuclear-spin-polarized Hi atomic beam may then enter a nuclear reactor (not shown).

Figure 2B:
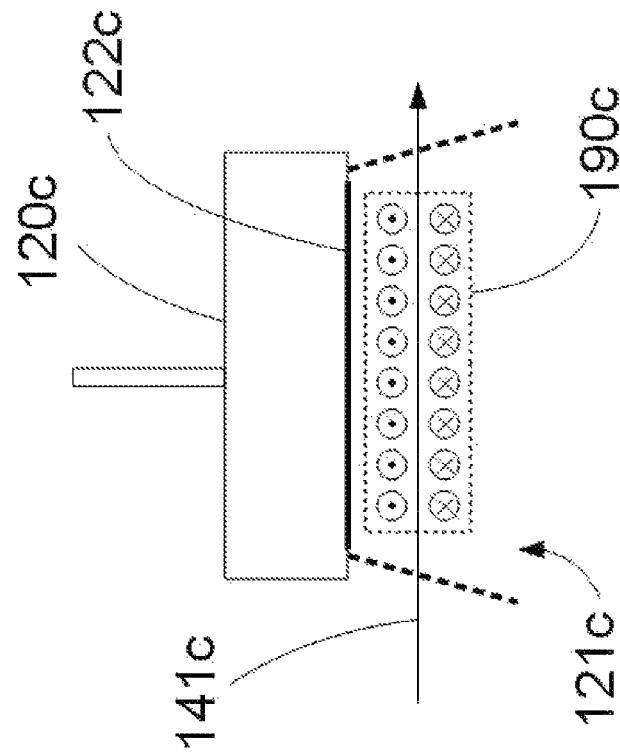
FIGS. 2A and 2B schematically illustrate examples of neutralizing means.
Figure 2A:
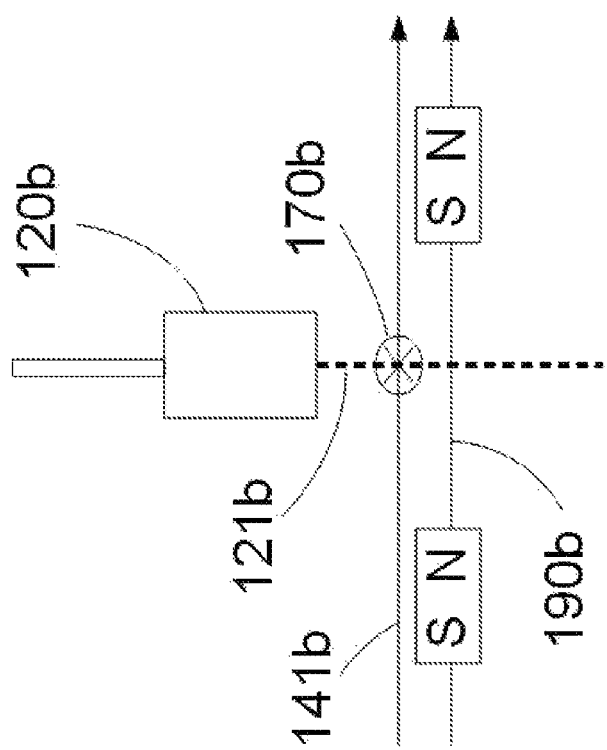

The example of FIG. 2A depicts a pulsed nozzle 120b which may generate a pulsed molecular beam 121b which may be intersected by a photodissociation laser beam 141b. In the example, the polarized electron beam 190b may be guided by magnetic fields generated e.g. by magnets. FIG. 2A further depicts an ionization laser 170b which may intersect the molecular beam before or after being photodissociated.

In another example shown in FIG. 2B, the nozzle 120 of FIGS. 1A-1C may be a slit nozzle 120c comprising a slit 122c which may generate a beam 121c. The beam 121c may be intersected by a photodissociation laser beam 141c thereby producing spin polarized Hydrogen isotopes. In FIG. 2B the neutralizing means 190 may be a solenoid 190c which may produce a magnetic field. The solenoid 190c may be arranged so as to interact with the produced spin polarized Hydrogen isotopes.

In an example (not shown), spin polarized Hydrogen isotopes which may be e.g. nuclearly polarized, may collide e.g. with electronically polarized Hydrogen atoms thereby neutralizing spin polarized Hydrogen isotopes. In such a case, there may be no need to use neutralizing means as the collision would indeed produce a neutral beam of spin polarized Hydrogen isotopes.

Figure 3A:
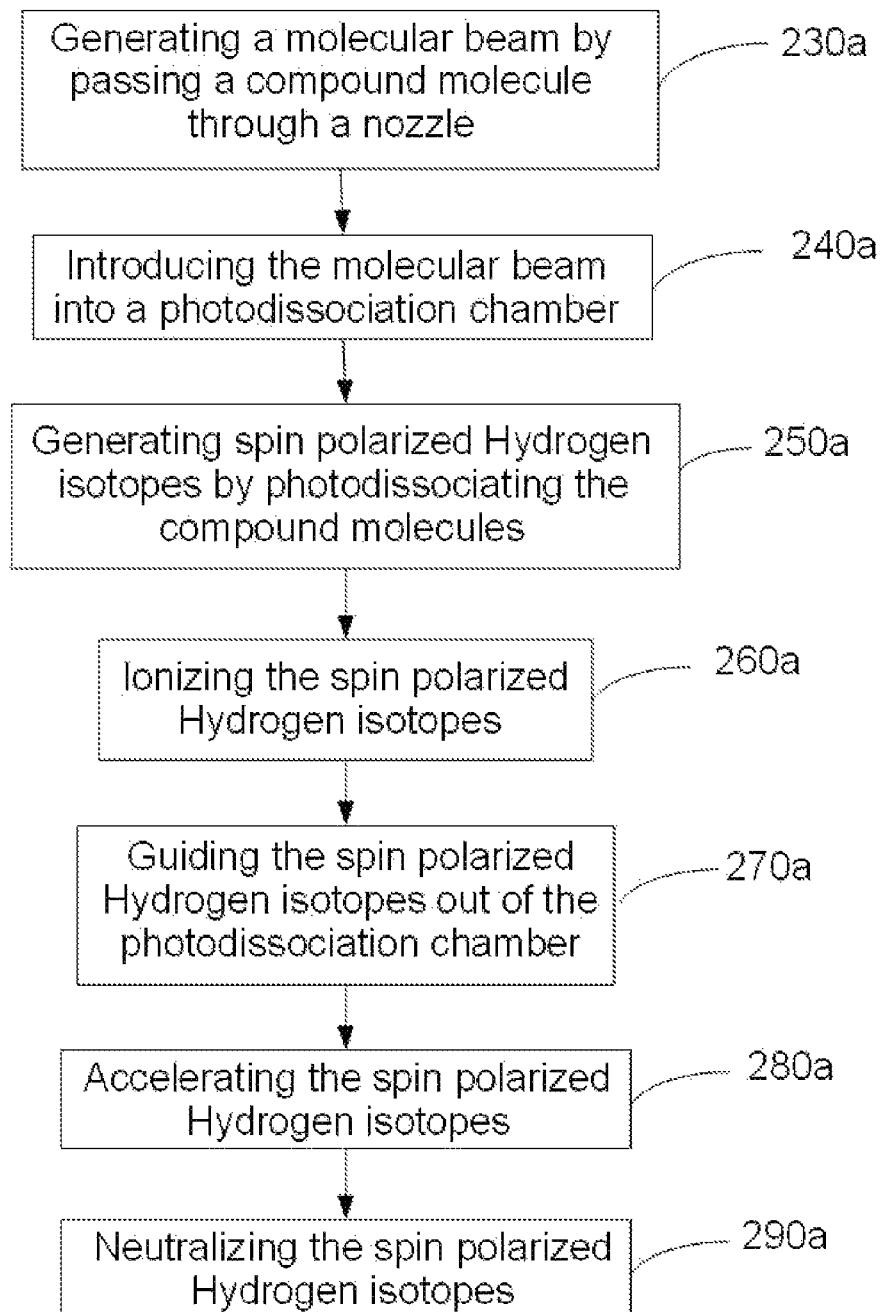
FIG. 3A schematically illustrates an example of a method for producing a neutral beam of spin polarized Hydrogen isotopes.

FIG. 3A shows a flow diagram of a method for producing a neutral beam of spin polarized Hydrogen isotopes according to an example. A molecular beam may be generated, in block 230a, by passing compound molecules comprising a Hydrogen isotope and a second element through a nozzle. In an example, the generated molecular beam may be a pulsed molecular beam (as shown in the example of FIG. 1A). In another example, the generated molecular beam may be a continuous molecular beam.

The molecular beam may be introduced, in block 240a, into a photodissociation chamber and the molecular beam may be subsequently expanded. The expansion may allow the molecular beam to be rotationally cooled which facilitates the alignment of molecular bonds e.g. by using electric fields. Additionally, in examples having low beam densities e.g. below about $10^{16}$ particles/cm$^{-3}$, the expansion may also comprise cooling the compound molecules translationally which enables to confine and isolate the produced spin polarized Hydrogen isotopes.

Then spin polarized Hydrogen isotopes may be generated by photodissociating the compound molecules of the molecular beam, in block 250a, e.g. by intersecting it at a predetermined angle, e.g. near 0°, with a photolysis laser beam thereby producing spin polarized Hydrogen isotopes. The Hydrogen isotopes may be ionized, in block 260a, and may be guided, in block 270a, out of the photodissociation chamber, e.g. into a nuclear fusion reactor. The produced spin polarized Hydrogen isotopes may be accelerated, in block 280a, e.g. to 1 keV-1 MeV, and neutralized, in block 290a, either by neutralizing means 190 according to any of disclosed examples or by colliding with e.g. electronically polarized Hydrogen atoms.

Figure 3B:
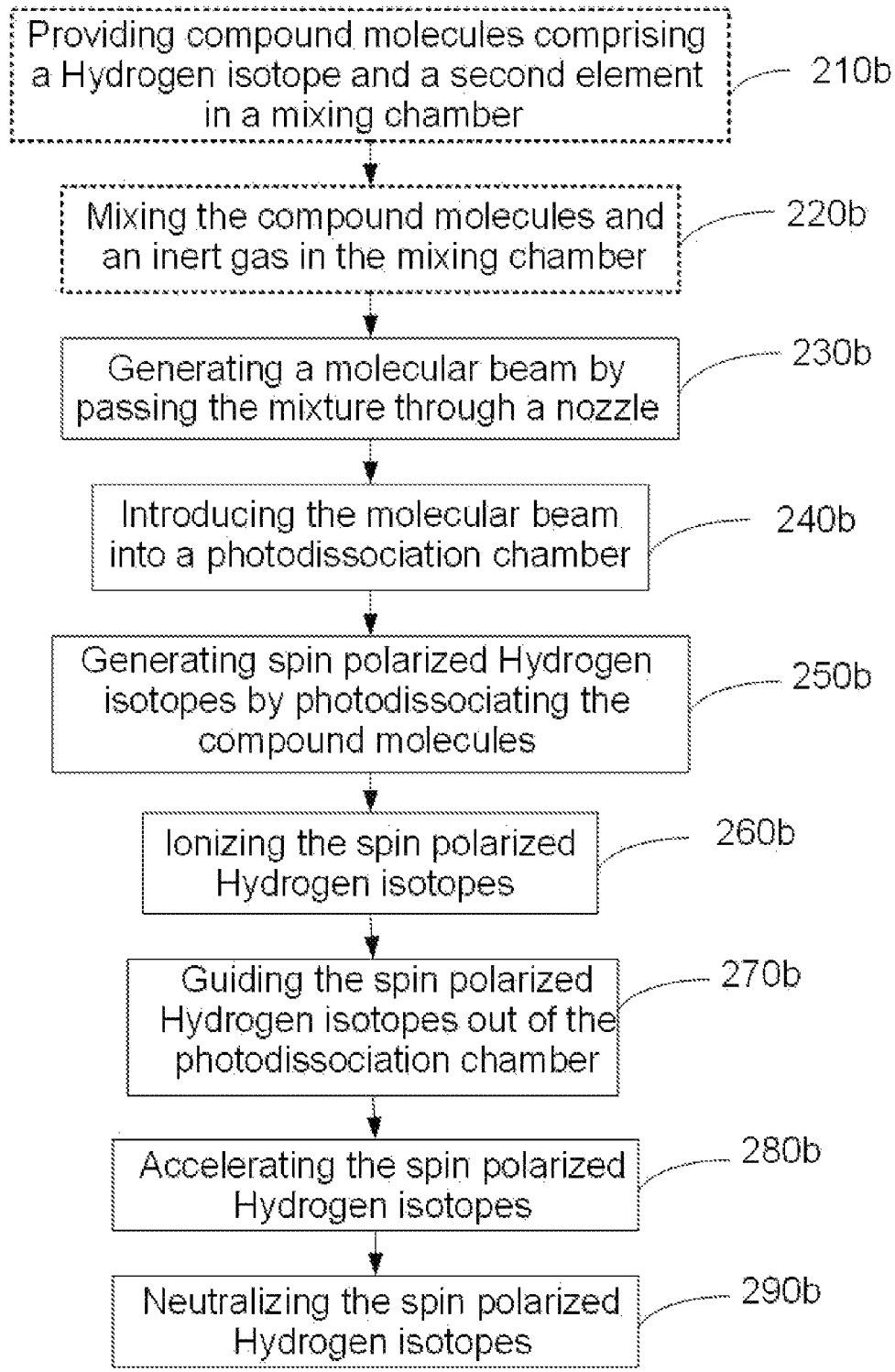
FIG. 3B schematically illustrates an example of a method for producing a neutral beam of spin polarized Hydrogen isotopes.

FIG. 3B shows a flow diagram of a method for producing a neutral beam of spin polarized Hydrogen isotopes according to an example. The compound molecules comprising a Hydrogen isotope and a second element may be provided, in block 210b, e.g. in a mixing chamber. Optionally, the compound molecules may be mixed, in block 220b, with an inert gas e.g. a Noble gas such as He, or with an inert molecule e.g. $N_2$, to aid the compound molecules to be expanded e.g. in a cold supersonic expansion, afterwards.

A molecular beam may then be generated, in block 230b, by passing the compound molecules through a nozzle. The generated molecular beam may be a pulsed molecular beam, as in the example of FIG. 1A. In another example, the generated molecular beam may be a continuous molecular beam.

The molecular beam may then be introduced, in block 240b, e.g. in a photodissociation chamber and subsequently expanded, thereby rotationally cooling the molecular beam. A rotational cooling facilitates the alignment of molecular bonds e.g. by using electric fields. Moreover, in examples having low beam densities e.g. below about $10^{16}$ cm$^{-3}$, the expansion may also cooling the compound molecules translationally. A translational cooling enables the later on produced isotopes i.e. photodissociated Hydrogen isotopes, to be confined in space and therefore to travel and to be isolated. That is, the molecular beam may go down, as shown in FIG. 1A, at about 1 km/s while the H atoms may go at about 20 km/s sideways, therefore, the H atoms may travel sideways outside of the beam, and thus be isolated from the molecular beam.

The spin polarized Hydrogen isotopes may then be generated by photodissociating the compound molecules of the molecular beam, in block 250b, e.g. by intersecting the molecular beam with a photolysis laser beam at a predetermined angle e.g. near 0°.

In an example, the photolysis laser may be a pulsed photolysis laser that intersects a pulsed molecular beam. In an example, the photolysis laser beam may be a continuous photolysis laser that intersects a continuous molecular beam.

The photodissociation laser beam breaks the chemical bonds of the compound molecules and therefore, each compound molecule splits into a Hydrogen isotope photofragment i.e. H, D or T, and a second element. In addition, the Hydrogen isotopes produced by the photodissociation are electron-spin polarized Hydrogen isotopes, i.e. the resulting photodissociated isotopes would have polarized electrons and unpolarized nuclei, as photodissociation would only polarize the isotopes electronically.

In some cases the electronic polarization of the Hydrogen isotope photofragment i.e. electron-spin polarized Hydrogen isotopes, may be required. However, in some other cases it may be desirable to produce nuclear-spin polarized Hydrogen isotopes.

The produced spin polarized Hydrogen isotopes may then ionized, in block 260b, and may be guided, in block 270b, out of the photodissociation chamber, e.g. into a nuclear fusion reactor.

The produced spin polarized Hydrogen isotopes may be accelerated, in block 280b, and neutralized, in block 290b, according to any of the examples disclosed.

Figure 3C:
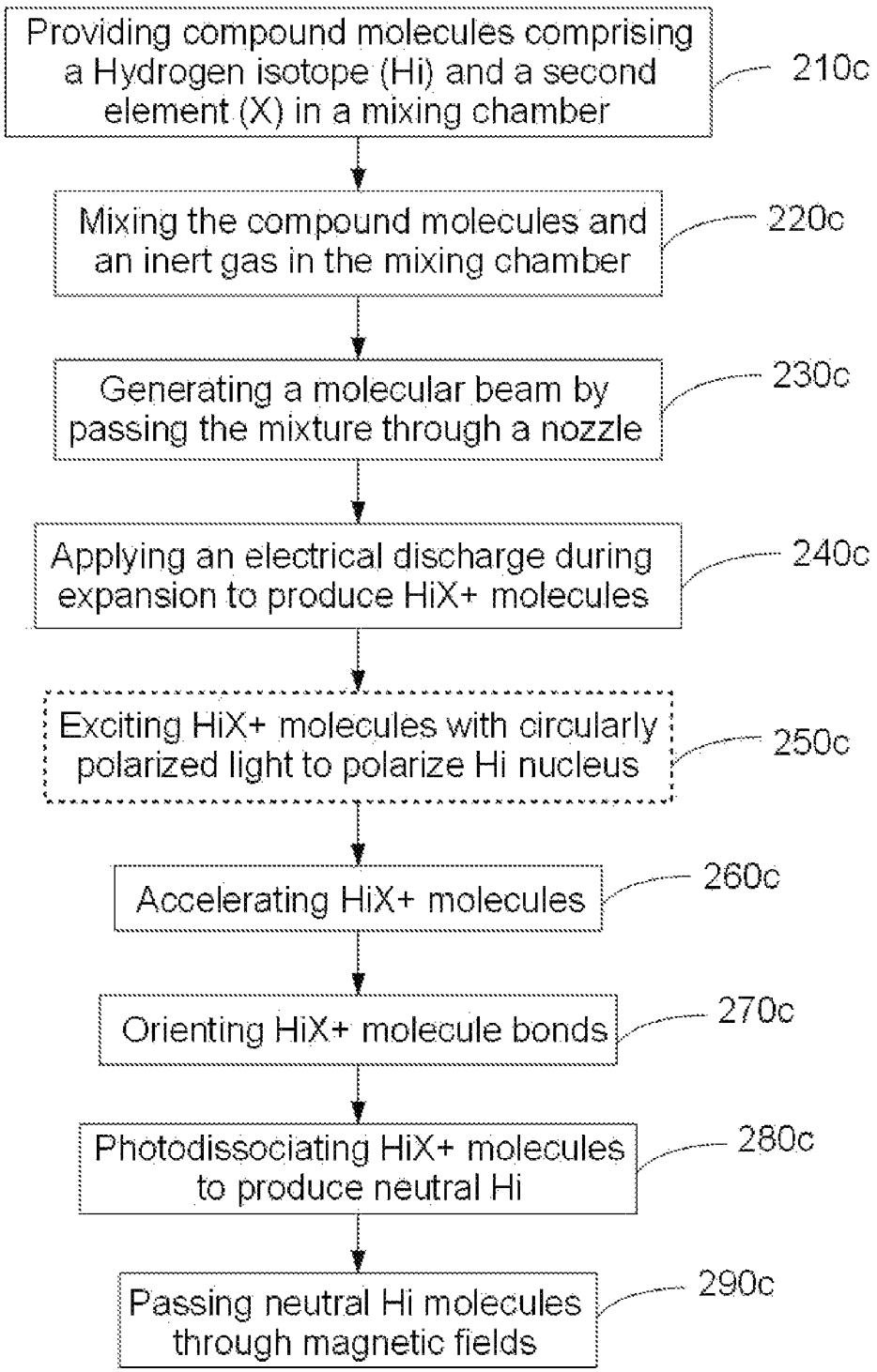
FIG. 3C schematically illustrates a method for producing a neutral beam of spin polarized Hydrogen isotopes according to an example.

FIG. 3C shows a flow diagram of a method for producing a neutral beam of spin polarized Hydrogen isotopes according to another example. The compound molecules HiX comprising H isotope (Hi) and second element (X) may be provided, in block 210c, in a mixing chamber. The HiX molecules may be mixed, in block 220c, with an inert gas in the mixing chamber thereby obtaining a mixture. A molecular expansion may be generated, in block 230c, in the photodissociation chamber by passing the mixture through a nozzle e.g. according to any of the examples disclosed herein. During the expansion, an electrical discharge may be applied, in block 240c, to the beam, so as to produce HiX+ molecules.

Optionally, HiX+ molecules may be excited, in block 250c, with circularly polarized IR light to bound molecular states (either rovibrational or electronic transitions), and consequently to polarize the nuclear spin, i.e. the Hi nucleus, via the hyperfine interaction (See Refs. Rakitzis 2005, Rubio-Lago et al. 2006, Sofikitis et al. 2015).

Indeed, photodissociating HiX or HiX$^+$ with circularly polarized light parallel to molecular bonds using a perpendicular transition, via an excited dissociative electronic state with projection of electronic angular momentum along the molecular bond $\Omega_e > 0$ (preferably $\Omega_e = 1$ and preferably from the ground state with $\Omega_g < \Omega_e$, e.g. $\Omega_g = 0$), produces highly electronically polarized atomic photofragments Hi and X (see Refs Rakitzis 2005, Rubio-Lago et al. 2006, Sofikitis et al. 2015). The electronic polarization is then transferred to the nuclei via the hyperfine interaction on a characteristic timescale (about 1.5 ns for D and 0.35 ns for H and T).

The HiX$^+$ molecules may be guided to acceleration means to accelerate HiX$^+$ molecules, in block 260c, to a desired energy e.g. to 1 keV-1 MeV.

The HiX$^+$ molecular bonds may be oriented, in block 270c, e.g. by applying large electric fields parallel to the movement direction. The HiX$^+$ molecules may be photodissociated, in block 280c, e.g. with circularly polarized light parallel to HiX+ velocity, preferably via perpendicular transition to a state with $\Omega > 0$ to polarize the atomic Hi electron (see Refs. Rakitzis et al. 2003, Rakitzis 2004, Sofikitis et al. 2008), to yield Hi and second element X+[wherein X is chosen to have an ionization energy significantly less than the ionization energy of Hi, so after photodissociation, only X$^+$ (and not Hi$^+$) would be produced]. The accelerated neutral spin-polarized Hi beam may be passed through e.g.

the magnetic fields of the nuclear reactor, in block 290c, and enter the plasma of the nuclear reactor.

Figure 4:
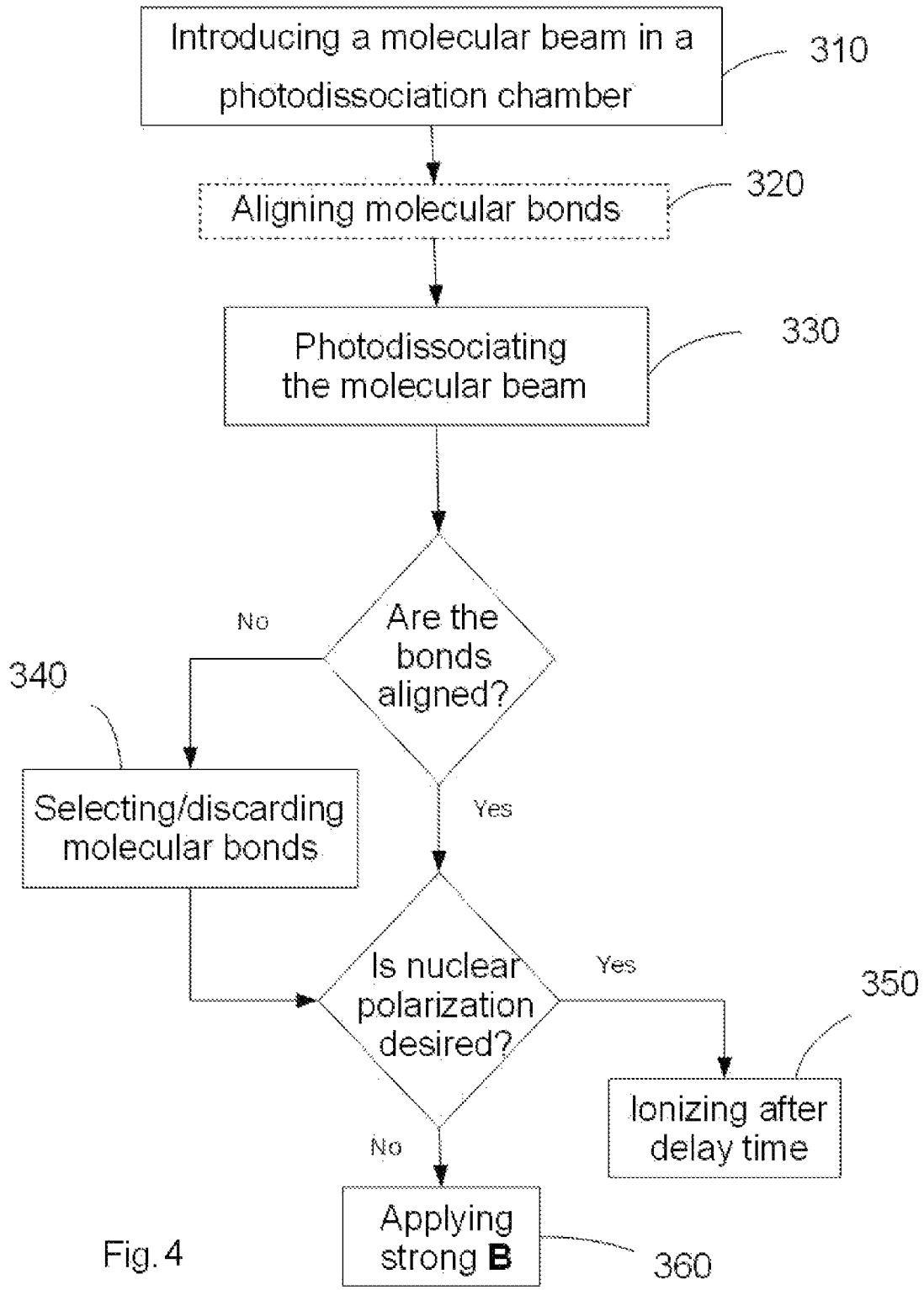
FIG. 4 schematically illustrates a method for producing a neutral beam of spin polarized Hydrogen isotopes according to an example.

FIG. 4 depicts a flow diagram of a method to produce a neutral beam of highly spin polarized Hydrogen isotopes with a predetermined spin polarization i.e. either highly electron-spin polarized Hydrogen isotopes or highly nuclear-spin polarized Hydrogen isotopes.

As in the examples of FIG. 3A or 3B, a molecular beam may be introduced, in block 310, in a photodissociation chamber e.g. after being passed through a nozzle. Subsequently, the molecular beam may expand and be photodissociated, in block 330, e.g. by being intersected with a photodissociation laser at an angle of e.g. about 0°.

Optionally, in order to maximize the electronic polarization i.e. and produce highly spin polarized Hydrogen isotopes, before photodissociation, in block 330, the molecular bonds of the compound molecules may be aligned, in block 320, in a predetermined orientation e.g. parallel to the photolysis polarization direction. The alignment, in block 320, may be done e.g. by using a strong electrostatic field or by using a strong electric field from high-intensity shot-pulse laser.

If the molecular bonds have not been aligned, in block 320, before photodissociation, in block 330, the photodissociated Hydrogen isotopes having molecule bonds of a predetermined orientation may, after photodissociation, be selected, in block 340, and the rest i.e. those isotopes having any other orientation, discarded e.g. by filtering the photofragments spatially or by ionizing them using Doppler selectivity.

In examples requiring the production of highly electron-spin polarized isotopes, a strong magnetic field, e.g. above 0.1 T, may be applied, in block 360 to the photodissociated isotopes to avoid the polarization to be transferred out of the electrons.

Due to the hyperfine interaction the polarization is transferred from the electrons to the nuclei and back in very short periods of time e.g. 0.7 ns for H and T. Thus, when nuclear-spin polarization is required, the polarization may be isolated once the polarization has been transferred to the nuclei. Such isolation of polarization may for example be carried out by intersecting the molecular beam with an ionization laser source at a predetermined angle e.g. 0°. The photodissociated isotopes may be ionized, in block 350 after a delay time i.e. to permit the complete transfer of the polarization from the electron to the nucleus and isolate the polarization once the nucleus is polarized. Indeed the polarization oscillates with a period e.g. of 0.7 ns for H and T, and of 3 ns for D, and so the ionization of the nuclei should occur almost immediately after photodissociation. To that end, photodissociation laser beam and electron beam or ionization laser beam may intersect the molecular beam substantially simultaneously.

The highly spin polarized isotopes may then be guided out (not shown) from the photodissociation chamber e.g. by electric fields e.g. to a nuclear fusion reactor. In an example, the highly spin polarized isotopes may be neutralized (not shown) before being guided out of the photodissociation chamber to be introduced e.g. to a nuclear reactor.

Figure 5:
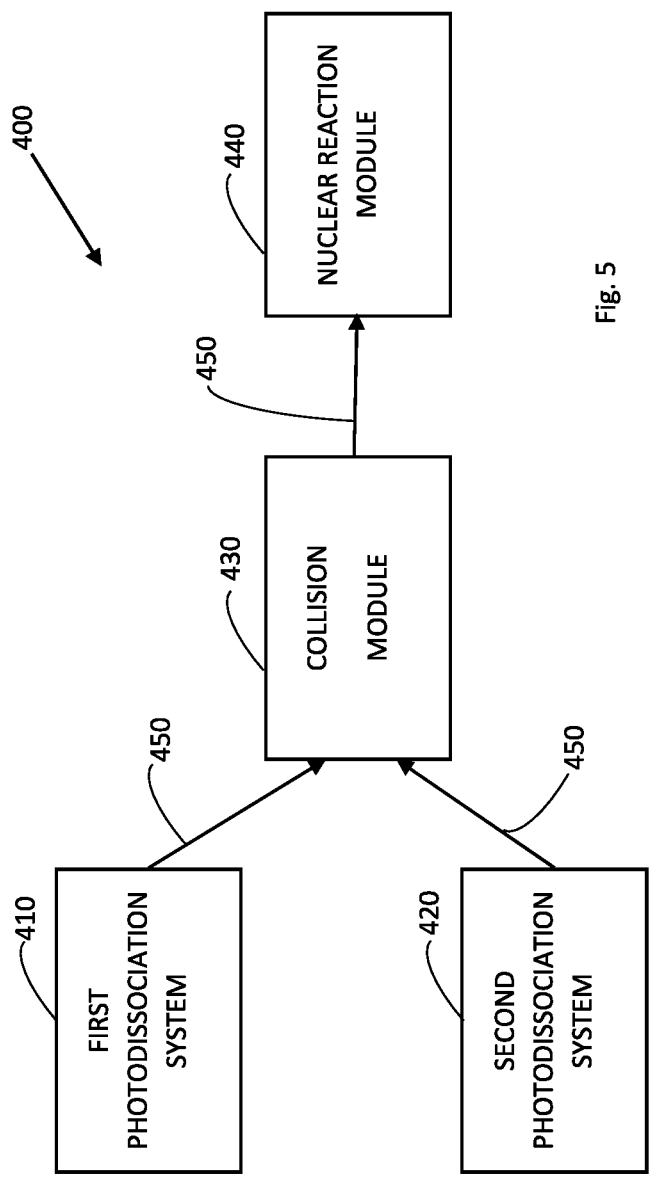
FIG. 5 schematically illustrates a nuclear reactor system according to an example.

FIG. 5 depicts a nuclear reactor system 400 which may comprise a first photodissociation system 410, a second photodissociation system 420, a collision module 430 and a nuclear reaction module 440.

The first and second photodissociation systems 410, 420 may produce highly spin-polarized Hydrogen isotopes following any of the methods previously disclosed. In the example of FIG. 5, photodissociation systems 410, 420 may be independent modules which may have an outlet connected to an inlet of the collision module 430 by a respective connector 450.

The collision module 430 may define an area in which the produced highly spin-polarized Hydrogen isotopes may collide e.g. after been guided from the highly spin-polarized Hydrogen isotope production modules. An outlet of the collision module may be further connected to an inlet of the nuclear reaction module 440 in which the nuclear may be hosted.

An example for producing a 100 keV polarized beam will be followingly disclosed.

The first photodissociation system 410 may produce nuclearly polarized D or T atoms by photodissociating DX or TX compound molecules, respectively. The compound molecules may have been expanded and aligned, before being photodissociated. Besides, after a delay time after photodissociation, photodissociated D or T may be ionized ($D^+$ or $T^+$) e.g. by electron or light pulses, to isolate the polarization once it has been transferred to the nuclei.

Such polarized $D^+$ or $T^+$ nuclei may be then accelerated e.g. about 100 keV, and may be guided through connectors 450 into a collision module 430.

Besides, in the second photodissociation system 420, highly spin polarized H atoms may be produced. Such H atoms may be produced by photodissociating HX compound molecules and subjecting the resulting photofragments to strong magnetic fields i.e. thereby obtaining electron-spin polarized H atoms. Generated highly electron spin Hydrogen atoms may also be guided into the collision module 430.

In some examples, the reactor system 400 may comprise a single photodissociation system in which a plurality of reactions may take place and therefore, D or T and H highly spin-polarized isotopes may be produced within a single photodissociation system.

In the collision module 430 accelerated $D^+$ or $T^+$ nuclei may collide with H atoms. As a result, $D^+$ and $T^+$ ions may be neutralized and highly polarized D or T atoms comprising high kinetic energy e.g. of about 100 keV, may be produced. Due to the strong magnetic fields that nuclear reaction module 440 e.g. Tokamak reactor, may have, only neutralized particles e.g. D or T neutralized isotopes, may enter the reactor.

In an example, the collision module 430 may be part of a photodissociation system.

Finally, the neutralized D or T atoms may be injected into the nuclear reaction module 440 thereby increasing the energy production of the nuclear reaction module 440. Indeed, when the neutralized beam had been introduced in the nuclear reaction module 440, it would be ionized i.e. due to the collisions, and therefore, it would become part of the previously existing plasma.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method for producing a neutral beam of spin polarized Hydrogen isotopes by photodissociating compound molecules, each compound molecule comprising a Hydrogen isotope and a second element, the method comprising:

generating a molecular beam by passing a compound molecule through a nozzle; introducing the molecular beam into a photodissociation chamber;

aligning molecular bonds of the molecular beam in a predetermined orientation before photodissociation;

photodissociating the molecular beam into spin polarized Hydrogen isotopes and second elements by intersecting the molecular beam with a circularly polarized photolysis laser beam;

guiding the molecular beam out of the photodissociation chamber;

accelerating the spin polarized Hydrogen isotopes; and neutralizing the spin polarized Hydrogen isotopes to generate a neutral beam.

2. The method according to claim 1, further comprising selecting molecules of the molecular beam having a predetermined orientation after photodissociating.

3. The method according to claim 1, wherein the circularly polarized photolysis laser beam is a short pulsed laser beam.

4. The method according to claim 1, further comprising applying a strong magnetic field to the spin polarized Hydrogen isotopes after photodissociating.

5. The method according to claim 1, further comprising:
providing the compound molecules in a mixing chamber; and
mixing the compound molecules with an inert gas or an inert molecule in the mixing chamber thereby obtaining a mixture, and wherein the mixture is passed through a nozzle.

6. The method according to claim 1, wherein photodissociating comprises photodissociating the molecular beam into spin-polarized Hydrogen isotopes and second elements.

7. The method according to claim 1, wherein the second element is selected from any of Fluorine (F), Chlorine (Cl), Bromine (Br), Iodine (I), Mercury (Hg), Oxygen (O) and Sulfur (S).

8. The method according to claim 1, wherein the generated neutral beam of spin polarized Hydrogen isotopes comprises at least 50% of the compound molecule Hydrogen isotopes spin polarized.

9. The method according to claim 1, further comprising ionizing the spin polarized Hydrogen isotopes by intersecting the molecular beam with an ionization laser beam or with an electron beam thereby isolating a desired polarization of the spin polarized Hydrogen isotopes.

10. The method according to claim 9, wherein ionizing the spin polarized Hydrogen isotopes is performed before photodissociating the molecular beam.

11. The method according to claim 9, wherein ionizing the spin polarized Hydrogen isotopes is performed after photodissociating the molecular beam.

12. A method for producing a neutral beam of spin polarized Hydrogen isotopes by photodissociating compound molecules, each compound molecule comprising a Hydrogen isotope and a second element, the method comprising:

generating a molecular beam by passing a compound molecules through a nozzle;

introducing the molecular beam into a photodissociation chamber;

exciting the molecular beam rovibrationally to a predetermined vibrational, rotational and intermediate hyperfine state;

photodissociating the molecular beam into spin polarized Hydrogen isotopes and second elements by intersecting the molecular beam with a circularly polarized photolysis laser beam;

guiding the molecular beam out of the photodissociation chamber;

accelerating the spin polarized Hydrogen isotopes; and neutralizing the spin polarized Hydrogen isotopes to generate a neutral beam.

13. The method according to claim 12, wherein exciting the molecular beam comprises exciting with circularly polarized infrared light.

14. A photodissociation system for producing a neutral beam of spin polarized Hydrogen isotopes by photodissociating compound molecules, each compound molecule comprising a Hydrogen isotope and a second element, the system comprising:

a nozzle to generate a molecular beam by passing the compound molecules through it;

means to align molecular bonds of the molecular beam in a predetermined orientation before photodissociation;

a photodissociation chamber coupled to the nozzle to receive and expand the molecular beam;

a circularly polarized photolysis laser source arranged with the photodissociation chamber to generate a circularly polarized photolysis laser beam to photodissociate the molecular beam into spin polarized Hydrogen isotopes and second elements;

means to guide the molecular beam out of the photodissociation chamber;

means to accelerate the spin polarized Hydrogen isotopes; and means to neutralize the spin polarized Hydrogen isotopes and generate the neutral beam.

15. The photodissociation system according to claim 14, further comprising means for selecting molecular bonds of the molecular beam parallel to a quantization axis, said means being arranged with the photodissociation chamber.

16. The photodissociation system according to claim 15, wherein the means for selecting comprise one or more spatial filters.

* * * * *